March 14, 1967   C. L. GOUGH ETAL   3,309,548
ARMATURE LEAD CONNECTIONS
Filed Sept. 2, 1964
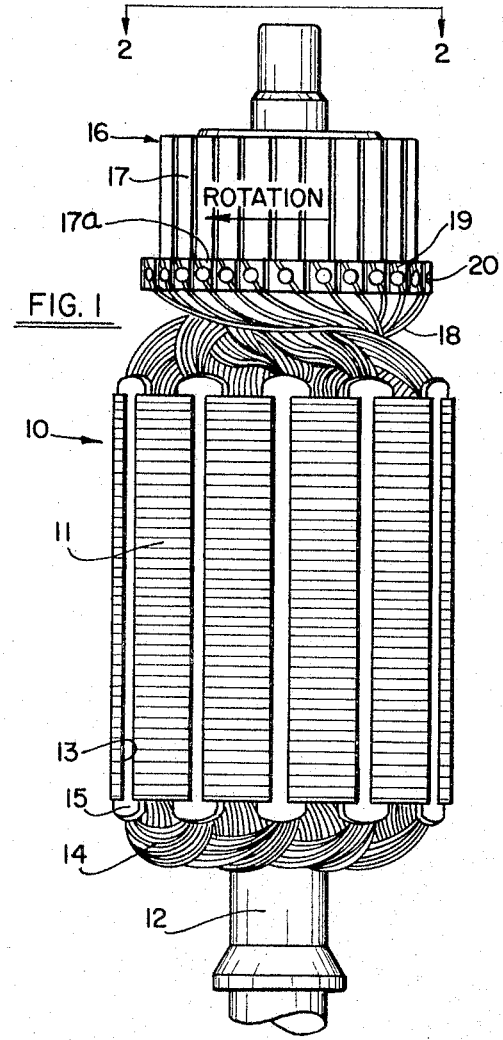
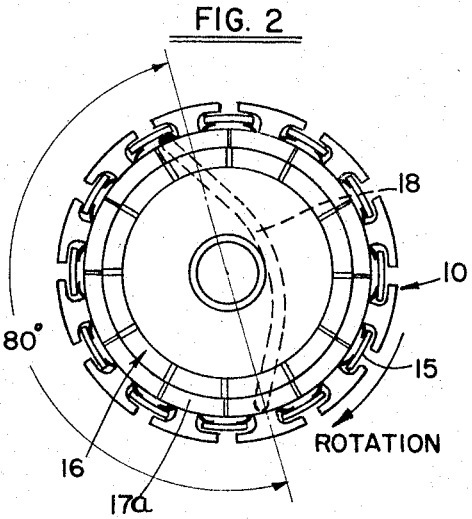
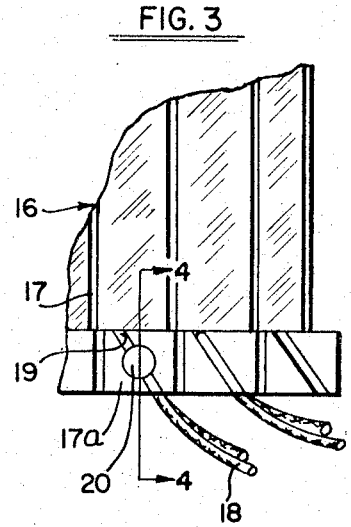
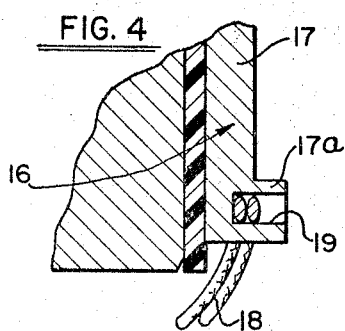
INVENTORS
ROBERT E. DORSEE
CARROLL L. GOUGH
BY Leonard Bloom
ATTORNEY

United States Patent Office 3,309,548
Patented Mar. 14, 1967

3,309,548
ARMATURE LEAD CONNECTIONS
Carroll L. Gough, Baltimore, and Robert E. Dorsee, Towson, Md., assignors to The Black and Decker Manufacturing Company, Towson, Md., a corporation of Maryland
Filed Sept. 2, 1964, Ser. No. 394,021
2 Claims. (Cl. 310—234)

The present invention relates to armatures for commutator-type electric motors which are subjected to relatively-high vibrational forces in usage, as for example, the motors used in portable electric hammers, hammer-drills, and impact wrenches; and more particularly, the invention relates to means for preventing lead breakage in the respective leads which connect the windings on the armature to the respective segments on the commutator.

One of the earliest solutions to this ploblem is the Riley et al. Patent 2,581,445 isued on Jan. 8, 1952, and assigned to the assignee of the present invention. In the Riley et al. patent, the leads from the respective coils in a winding slot on the armature are reinforced by means of a hollow helical conductor which in turn is secured to a respective segment or bar formed on the commutator, with the reinforcing conductor absorbing the stresses set up, primarily, as a result of vibrational forces imposed on the armature in the normal usage of the tool. A later solution is the Clagett Patent 2,790,101 issued on Apr. 23, 1957, and likewise assigned to the assignee of the present invention. In the Clagett patent, the slot on a respective commutator segment which receives the free end of the lead is skewed or displaced in the direction of rotation; and the lead, when secured in the slot, is likewise skewed in relation to its adjacent winding slot on the armature. The lead then bends back towards its respective winding slot; and the winding slot on the armature and its respective commutator segment are in substantial circumferential alinement with each other, with the winding slot being axially spaced, and usually directly above, its respective segment.

The present invention constitutes a further improvement on the Clagett patent, and combines the high reinforcing quality of the Riley et al. solution with the manufacturing economy and ease of assembly inherent in the later Clagett solution.

More specifically, the present invention resides in the discovery that if the winding slots in the Clagett patent are not in circumferential alinement with their respective segments on the commutator, but rather, are deliberately displaced by substantially 180 degrees, with the leads of the completed armature being in effect "twisted" around the adjacent portion of the armature shaft, that each lead becomes much longer than was previously the case; and accordingly, the respective leads can sustain much greater stresses, with the result that lead breakage is further reduced to a remarkable degree.

While it is appreciated that lead connections of 180 degree circumferential displacement, per se, are quite old in the art, witness the long since expired Pearson Patent 1,338,093, nevertheless, the purpose has been altogether different; and no one to date has recognized that if the lead connection pattern illustrated in the Pearson patent is combined with the teachings of the Clagett patent, that remarkably improved results could be obtained in eliminating lead breakage, with no sacrifice in manufacturing convenience and economy.

These and other objects of the present invention will become apparent upon a reading of the following specification, taken in conjunction with the enclosed drawing, in which:

FIGURE 1 is an elevation of the completed armature embodying the teachings of the present invention;

FIGURE 2 is an end view of the armature, taken from the lines 2—2 of FIGURE 1, with the broken lines illustrating the position of a respective lead between one of the winding slots on the armature and its respective segment on the commutator;

FIGURE 3 is an enlargement of a portion of FIGURE 1, showing the sequence in securing the leads to their respective segments on the commutator; and FIGURE 4 is a section view, taken along the lines 4—4 of FIGURE 3.

With reference to FIGURE 1, there is illustrated an armature 10 comprising a stack of laminations 11 mounted on a shaft 12, a plurality of winding slots 13 formed on the stack, windings or coils 14 in the slots, insulated coil stays 15 over the windings, and a commutator 16 mounted on the shaft, the commutator having respective segments 17 preferably formed with radially-extending portions 17a referred to in the art as "risers."

With further reference to FIGURE 2, each winding slot 14 on the armature is circumferentially displaced by about 180 degrees or so in relation to its respective segment 17 on the commutator; and each lead 18 is brought around to its respective commutator segment (preferably in the direction of rotation as shown in FIGURE 2) and is disposed in as close as possible to the armature shaft, so that the various leads are in effect "twisted" about the armature shaft as shown in FIGURE 1.

Each lead 18 thereby has its length deliberately increased—and brought around in the direction of rotation—for accommodating and absorbing relatively-high vibrational forces imposed upon the armature, and specifically, for eliminating lead breakage due primarily to torsional vibrations.

A skewed slot 19 is formed in each riser 17a of the commutator segment 17; and the slot is displaced or skewed preferably, but not necessarily, by an angle of 30 degrees. The free end of each lead 18 is suitably secured within its respective slot, preferably by a weld which is indicated somewhat schematically as at 20 in FIGURE 3. Each slot 19 is skewed so as to accommodate the direction of lead pull, which, preferably, is in the direction of rotation.

The cooperation between the skewed design of the slots 19 and the deliberately increased length of the leads 18, together with the position of the leads in relation to the armature shaft and the direction of rotation, eliminates lead breakage with no sacrifice in manufacturing economy.

Preferably, each winding slot on the armature has two coils therein; and two respective leads, see FIGURES 3 and 4, are secured within each skewed slot on the commutator.

Obviously, many modifications may be made without departing from the basic spirit of the present invention; and accordingly, within the scope of the appended claims, the invention may be practiced other than has been specifically described herein.

We claim:

1. In an armature for a commutator-type of electric motor which is subjected to vibrational forces in usage, wherein the armature is provided with an armature shaft, a stack of laminations, and a plurality of conventional windings in respective winding slots formed therein, and further is provided with a respective plurality of commutator segments with respective leads connecting the segments to the windings, the improvement in means to prevent lead breakage, which comprises:

(a) each lead being brought around to its respective commutator segment in a position which is approximately 180 degrees away, circumferentially, from its winding slot on the armature, thereby deliberately increasing the length of the lead which may accommodate and absorb relatively-high vibrational forces imposed upon the armature; and each lead being disposed in as close as possible to the armature shaft, whereby the various leads are in effect twisted about the armature shaft with substantially no clearance therebetween;

(b) a skewed slot formed in each of the commutator segments; and (c) the free end of each lead being secured within the skewed slot of its respective segment on the commutator, the skewed design of the slot further accommodating the imposition of vibrational forces on the armature.

2. The improvement of claim 1, wherein:

(a) each lead is brought around in the direction of rotation; and (b) each slot is skewed in the direction of rotation.

References Cited by the Examiner

UNITED STATES PATENTS

| 1,338,093 | 4/1920 | Pearson | 310—265 |
| 2,176,361 | 10/1939 | Scruggs | 310—236 |
| 2,476,795 | 7/1949 | Avigdor | 310—233 |
| 2,790,101 | 4/1957 | Clagett | 310—234 |

FOREIGN PATENTS 1,360,964  4/1964  France.

MILTON O. HIRSHFIELD, *Primary Examiner.*

D. F. DUGGAN, *Assistant Examiner.*